(12) United States Patent
Antar et al.

(10) Patent No.: US 10,493,373 B1
(45) Date of Patent: Dec. 3, 2019

(54) DESALINATION AND CLIMATE CONTROL SYSTEM

(71) Applicant: King Fahd University of Petroleum and Minerals, Dhahran (SA)

(72) Inventors: Mohamed A. Antar, Dhahran (SA); Dahiru Umar Lawal, Dhahran (SA); Atia Khalifa, Dhahran (SA); Syed M. Zubair, Dhahran (SA); Fahad Al-Sulaiman, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 15 days.

(21) Appl. No.: 15/980,178

(22) Filed: May 15, 2018

(51) Int. Cl.
| | |
|---|---|
| *B01D 1/28* | (2006.01) |
| *F24F 3/14* | (2006.01) |
| *F24F 6/12* | (2006.01) |
| *F24F 1/022* | (2019.01) |
| *B01D 5/00* | (2006.01) |
| *C02F 1/04* | (2006.01) |
| *C02F 1/14* | (2006.01) |
| *H02S 99/00* | (2014.01) |
| *C02F 103/08* | (2006.01) |

(52) U.S. Cl.
CPC ............... *B01D 1/28* (2013.01); *B01D 5/006* (2013.01); *B01D 5/0039* (2013.01); *B01D 5/0075* (2013.01); *C02F 1/041* (2013.01); *C02F 1/048* (2013.01); *C02F 1/14* (2013.01); *F24F 1/022* (2013.01); *F24F 3/1405* (2013.01); *F24F 6/12* (2013.01); *C02F 2103/08* (2013.01); *C02F 2201/009* (2013.01); *H02S 99/00* (2013.01)

(58) Field of Classification Search
CPC ........... C10B 53/07; C10B 27/06; C10G 1/10; C10G 2400/22
See application file for complete search history.

(56) References Cited

U.S. PATENT DOCUMENTS

| | | | | |
|---|---|---|---|---|
| 2015/0129410 A1* | 5/2015 | Govindan | ................. | C02F 1/04 202/185.3 |
| 2017/0081211 A1 | 3/2017 | Becker | | |

FOREIGN PATENT DOCUMENTS

| | | |
|---|---|---|
| EP | 0 979 801 A1 | 2/2000 |
| WO | 2007/013099 A1 | 2/2007 |

OTHER PUBLICATIONS

A.E. Kabeel, et al., "Water Desalination Using a Humidification-Dehumidification Technique—A Detailed Review", Natural Resources, vol. 4, Jul. 2013, pp. 286-305.

* cited by examiner

*Primary Examiner* — Brian A McCaig
(74) *Attorney, Agent, or Firm* — Oblon, McClelland, Maier & Neustadt, L.L.P.

(57) ABSTRACT

A desalination and climate control system including a vapor-compression system having an evaporator, a condenser, and a working fluid that circulates between the evaporator and the condenser to transfer heat from the condenser to the evaporator, and a desalination system coupled with the desalination system having a humidifier that encloses the condenser, receives air and saline fluid, passes the saline fluid through the condenser to extract the heat and vaporizes the saline to provide humidified air and brine fluid, and a dehumidifier that encloses the evaporator, condensates the humidified air, and provides the air and demineralized fluid.

20 Claims, 5 Drawing Sheets

DESALINATION AND CLIMATE CONTROL SYSTEM

BACKGROUND

Field of the Disclosure

The present disclosure relates to desalination and climate control system relying on humidification and dehumidification processes combined with vapor-compression cycle processes.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Producing water suitable for human consumption, agriculture, and/or irrigation from inconsumable water, e.g. saltwater, and/or highly mineralized water, in hot, dry and/or arid regions is essential.

To this end, conventional desalination processes that extract inconsumable water and remove minerals, e.g. salt, from the inconsumable water to provide fresh water that is proper for human consumption have been proposed and used. These conventional desalination processes may rely on multi-stage state transformation cycles, e.g. vapor compression cycles, and distillation cycles, and/or ion exchange/membrane processes, e.g. electro dialysis reversal, reverse osmosis, nanofiltration, membrane distillation, and/or forward osmosis.

Although these conventional desalination processes have been widely used, they present important drawbacks. Notably, these conventional desalination processes can be energy demanding making them unsuitable for remote areas and/or are regions where temperatures are high and an important part of the energy is allocated to provide comfortable interior climate control, e.g. air-conditioning systems.

Thus, a desalination and climate control system that overcomes the above mention limitation of efficiency is desired.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

Accordingly, one object of the present disclosure is to provide a desalination and climate control system which overcomes the above-mentioned limitation of efficiency and energy consumption. The desalination and climate control system disclosed provides an efficient desalination process by being coupled to a compression-vapor cycle process that provides heat to the desalination process as well as climate control.

In one non-limiting illustrative example, a desalination and climate control system includes a vapor-compression system having an evaporator, a condenser, and a working fluid that circulates between the evaporator and the condenser to transfer heat from the condenser to the evaporator, and a desalination system coupled with the desalination system having a humidifier that encloses the condenser, receives air and saline fluid, passes the saline fluid through the condenser to extract the heat and vaporizes the saline to provide humidified air and brine fluid, and a dehumidifier that encloses the evaporator, condensates the humidified air, and provides the air and demineralized fluid.

In another non-limiting illustrative example, a desalination and climate control system includes a vapor-compression system having an evaporator, a condenser, and a working fluid that circulates between the evaporator and the condenser to transfer heat from the condenser to the evaporator, a desalination system coupled with the desalination system having a humidifier that encloses the condenser, receives air and saline fluid, passes the saline fluid through the condenser to extract the heat and vaporizes the saline fluid to provide humidified air and brine fluid, and a dehumidifier that encloses the evaporator, condensates the humidified air, and provides the air and demineralized fluid, and a plurality of heat exchangers that recovers heat from the brine fluid and increases efficiency of the desalination and climate control system.

In another non-limiting illustrative example, a desalination and climate control system includes a vapor-compression system having an evaporator, a condenser, and a working fluid that circulates between the evaporator and the condenser to transfer heat from the condenser to the evaporator, a desalination system coupled with the desalination system having a humidifier that encloses the condenser, receives air via a fan and saline fluid via a pump, passes the saline fluid through the condenser to extract the heat and vaporizes the saline fluid to provide humidified air and brine fluid, and a dehumidifier that encloses the evaporator, condensates the humidified air, and provides the air and demineralized fluid, a plurality of heat exchangers that recovers heat from the brine fluid and increases efficiency of the desalination and climate control system, and a solar system that captures sunlight and provides electricity to at least one of the pump and the fan.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. A more complete appreciation of the disclosure and many of the attendant advantages thereof will be readily obtained as the same becomes better understood by reference to the following detailed description when considered in connection with the accompanying drawings, wherein.

DETAILED DESCRIPTION

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 1:
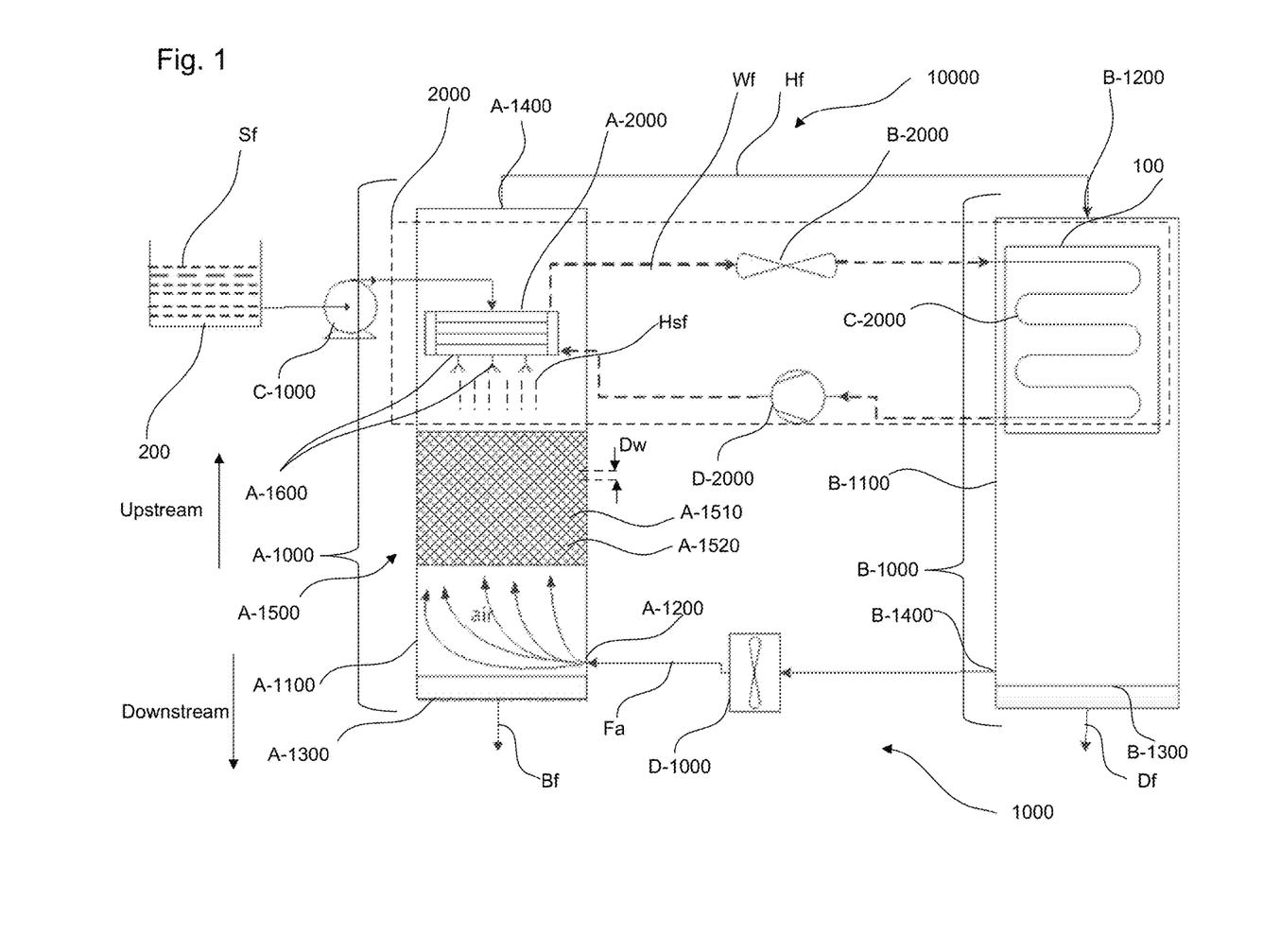
FIG. 1 is a schematic view of a desalination and climate control system in a first configuration, according to certain aspects of the disclosure.

FIG. 1 is a schematic view of a desalination and climate control system 10000 in a first configuration, according to certain aspects of the disclosure.

The desalination and climate control system 10000 can include a vapor-compression system 2000 coupled with a desalination system 1000.

The desalination system 1000 can extract saline fluid Sf, e.g. sea water, and/or water highly mineralized and unsuitable for human consumption, and generate demineralized fluid Df, e.g. pure water and/or water suitable for human consumption, while the vapor-compression system 2000 can transfer heat from an environment 100, e.g. a house, a room, a refrigerator, and/or any volume that needs to be cooled, to the desalination system 1000.

The coupling between the desalination system 1000 and the vapor-compression system 2000 further increases the efficiency of the desalination and climate control system 10000 by exchanging heat between the desalination system 1000 and the vapor-compression system 2000.

The vapor-compression system 2000 circulates a working fluid Wf, e.g. refrigerant, ammonia, hydrofluorocarbon, and/or chlorofluorocarbons, that extracts heat from the environment 100, and provides the extracted heat to the desalination system 1000.

The vapor-compression system 2000 can include a condenser A-2000, an expansion valve B-2000 fluidly connected to the condenser A-2000, an evaporator C-2000 fluidly connected to the expansion valve B-2000, a compressor D-2000 fluidly connected to the evaporator C-2000 and the condenser A-2000 fluidly connected to the compressor D-2000 and the expansion valve B-2000.

The condenser A-2000 can receive the working fluid Wf from the compressor D-2000 in a first state, e.g. liquid state with a temperature between 10° and 60°, cool down the working fluid Wf by transferring heat from the working fluid Wf to the saline fluid Sf, and provide the working fluid Wf to the expansion valve B-2000 in a second state, e.g. liquid with a temperature between 0° and 30°.

The condenser A-2000 can be any type of heat exchanger configured to facilitate heat exchange between the saline fluid Sf and the working fluid Wf. For example, the condenser A-2000 can be a stacked corrugated plate heat exchanger, and/or shell and serpentine channel heat exchanger.

The expansion valve B-2000 can receive the working fluid Wf in the second state, expand and cools down the working fluid Wf to a third state, e.g. gaseous state with a temperature between 0° and 30°.

The expansion valve B-2000 can be any type of valve configured to reduce pressure of the working fluid Wf and allow the working fluid Wf to change between the second state and the third state. For example, the expansion valve B-2000 can be a thermal expansion valve.

The evaporator C-2000 can receive the working fluid Wf in the third state, heat the working fluid Wf by extracting heat from the environment 100, and provide to the compressor D-2000 the working fluid Wf in a fourth state, e.g. gaseous state with a temperature between 10° and 60°.

The evaporator C-2000 can be any type of heat exchanger configured to facilitate heat exchange between the working fluid Wf and the environment 100. For example, the evaporator C-2000 can be a stacked corrugated plate heat exchanger, and/or shell and serpentine channel heat exchanger.

The compressor D-2000 can receive the working fluid Wf in the fourth state, compress the working fluid Wf, and provide to the condenser A-2000 the working fluid Wf in the first state.

The compressor D-2000 can be any type of compressor configured to reduce the volume and increase the pressure of the working fluid Wf from the fourth state to the first state.

The desalination system 1000 can include a pump C-1000, a humidifier A-1000 fluidly connected to the pump C-1000, a dehumidifier B-1000 fluidly connected to the humidifier A-1000, and a fan D-1000 fluidly connecting the dehumidifier B-1000 with the humidifier A-1000.

The pump C-1000 can extract and transfer the saline fluid Sf from a saline fluid reservoir 200, e.g. sea body and/or basin containing sea water, to the humidifier A-1000. The pump C-1000 can be any type of pump with sufficient pressure head to force the saline fluid Sf through the condenser A-2000. For example, the pump C-1000 can be an impulse pump, a velocity pump, and/or a valveless pump, providing a head pressure pump between 1 bar and 100 bars, and preferably between 20 bars and 80 bars.

The fan D-1000 can transfer fresh air Fa from the dehumidifier B-1000 to the humidifier A-1000. The fan D-1000 can be any type of fan with sufficient pressure head to force air through the humidifier A-1000. For example, the fan D-1000 can be an axial flow fan, a centrifugal flow fan, and/or a cross flow fan with a head pressure fan between 0.1 bar and 10 bars, and preferably between 1 bar and 5 bars.

The dehumidifier B-1000 can receive humidified fluid Hf from the humidifier A-1000, condense the humidified fluid Hf, and provide the fresh air Fa and the demineralized fluid Df.

The humidifier A-1000 can receive the saline fluid Sf from the pump C-1000, receive the fresh air Fa from the fan D-1000, and provide to the dehumidifier B-1000 the humidified fluid Hf.

The humidifier A-1000 can include a humidifier housing A-1100 that encapsulates the condenser A-2000, a humidifier inlet A-1200 fluidly connected with the fan D-1000, a humidifier catch pan A-1300 that is positioned in a downstream portion of the humidifier housing A-1100, a humidifier outlet A-1400 fluidly connected with the dehumidifier B-1000, a humidifier screen A-1500 positioned between the humidifier inlet A-1200 and the humidifier outlet A-1400, and a plurality of humidifier sprayers A-1600 facing the humidifier screen A-1500.

Alternatively, the condenser A-2000 can be placed in an external environment, e.g. outside the humidifier housing A-1100, to exchange heat with the external environment.

The humidifier housing A-1100 can provide a downward passage for the saline fluid Sf from the condenser A-2000 to the humidifier catch pan A-13000 through the humidifier screen A-1500, as well as for the fresh air Fa from the humidifier inlet A-1200 to the humidifier outlet A-1400 through the humidifier screen A-1500.

The pump C-1000 can push the saline fluid Sf through the condenser A-2000 to provide a heated saline fluid Hsf. The condenser A-2000 can transfer heat from the working fluid Wf to the saline fluid Sf and provide the heated saline fluid Hsf.

The plurality of humidifier sprayers A-1600 can receive the heated saline fluid Hsf and spread the heated saline fluid Hsf over the humidifier screen A-1500.

The humidifier screen A-1500 can receive the heated saline fluid Hsf, and trap the heated saline fluid Hsf under the form of a plurality of droplets to increase the surface contact between the heated saline fluid Hsf and the fresh air Fa and facilitate the vaporization of the heated saline fluid Hsf.

The humidifier screen A-1500 can include a plurality of screen wires A-1510 meshed together to form a plurality of screen openings A-1520.

Each opening of the plurality of screen openings A-1520 can have a diameter Dw sufficiently small to fully wet the saline fluid Sf but sufficiently large to prevent the saline fluid Sf from accumulating and rising inside the humidifier housing A-1100. For example, the diameter Dw can be between 0.01 mm. and 10.00 mm, and preferably between 0.10 mm and 1.00 mm.

The fan D-1000 can blow the fresh air Fa through the humidifier screen A-1500 and separate the heated saline fluid Shf into a brine fluid Bf, e.g. fluid saturated with minerals, a humidified fluid Hf, e.g. demineralized vapor mixed with air, to the dehumidifier outlet A-1400.

The dehumidifier housing B-1100 can provide a downstream passage, e.g. from the plurality of humidifier sprayers A-1600 to the humidifier screen A-1500 for the saline fluid Sf, and an upstream passage, e.g. from the humidifier inlet A-1200 to the humidifier screen A-1500.

The humidifier catch pan A-1300 can collect the brine fluid Bf that goes down from the humidifier screen A-1500 while the humidified fluid Hf can flow from the humidifier A-1000 to the dehumidifier B-1000.

The dehumidifier B-1000 can include a dehumidifier housing B-1100 that encapsulates the evaporator C-2000, a dehumidifier catch pan B-1300 that is positioned in a downstream portion of the dehumidifier housing B-1100, a dehumidifier outlet B-1400 fluidly connected with the humidifier A-1000, and a dehumidifier inlet B-1200 fluidly connected to the fan D-1000.

The dehumidifier housing B-1100 can provide a downstream passage, e.g. from the dehumidifier inlet B-1200 to the dehumidifier outlet B-1400.

The humidified fluid Hf can be cooled down and condensed through the condenser A-2000 to provide the demineralized fluid Df that is collected in the dehumidifier catch pan B-1300 and the fresh air Fa that can flow to the humidifier A-1000 via the fan D-1000.

Figure 2:
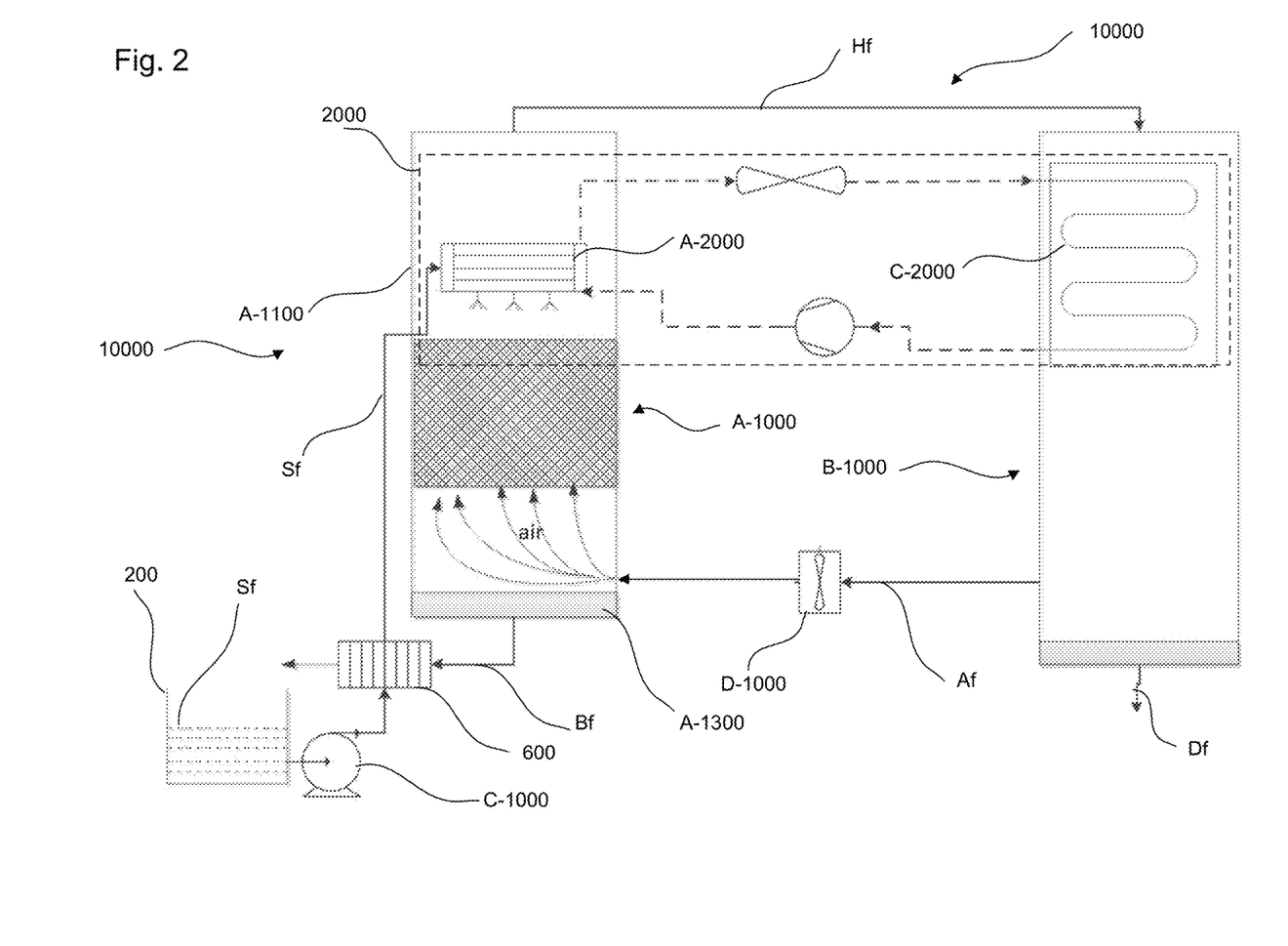
FIG. 2 is a schematic view of the desalination and climate control system in a second configuration, according to certain aspects of the disclosure.

FIG. 2 is a schematic view of the desalination and climate control system 10000 in a second configuration, according to certain aspects of the disclosure.

In addition, the desalination and climate control system 10000 can include a first supplemental heat exchanger 600 positioned outside the humidifier housing A-1100 and fluidly connected to the pump C-1000, the condenser A-2000, and the humidifier catch pan A-1300.

The first supplemental heat exchanger 600 can receive the saline fluid Sf from the pump C-1000, receive the brine fluid Bf from the humidifier catch pan A-1300, and transfer heat from the brine fluid Bf to the saline fluid Sf before the saline fluid Sf enter the humidifier A-1000. The heat transferred form the brine fluid Bf to the saline fluid Sf can increase the temperature of the saline fluid Sf and facilitate the evaporation of the saline fluid Sf in the humidifier A-1000 making the desalination and climate control system 10000 more efficient.

The first supplemental heat exchanger 600 can be any type of heat exchanger configured to facilitate heat exchange between the brine fluid Bf and the saline fluid Sf. For example, the first supplemental heat exchanger 600 can be a stacked corrugated plate heat exchanger, and/or shell and serpentine channel heat exchanger.

Figure 3:
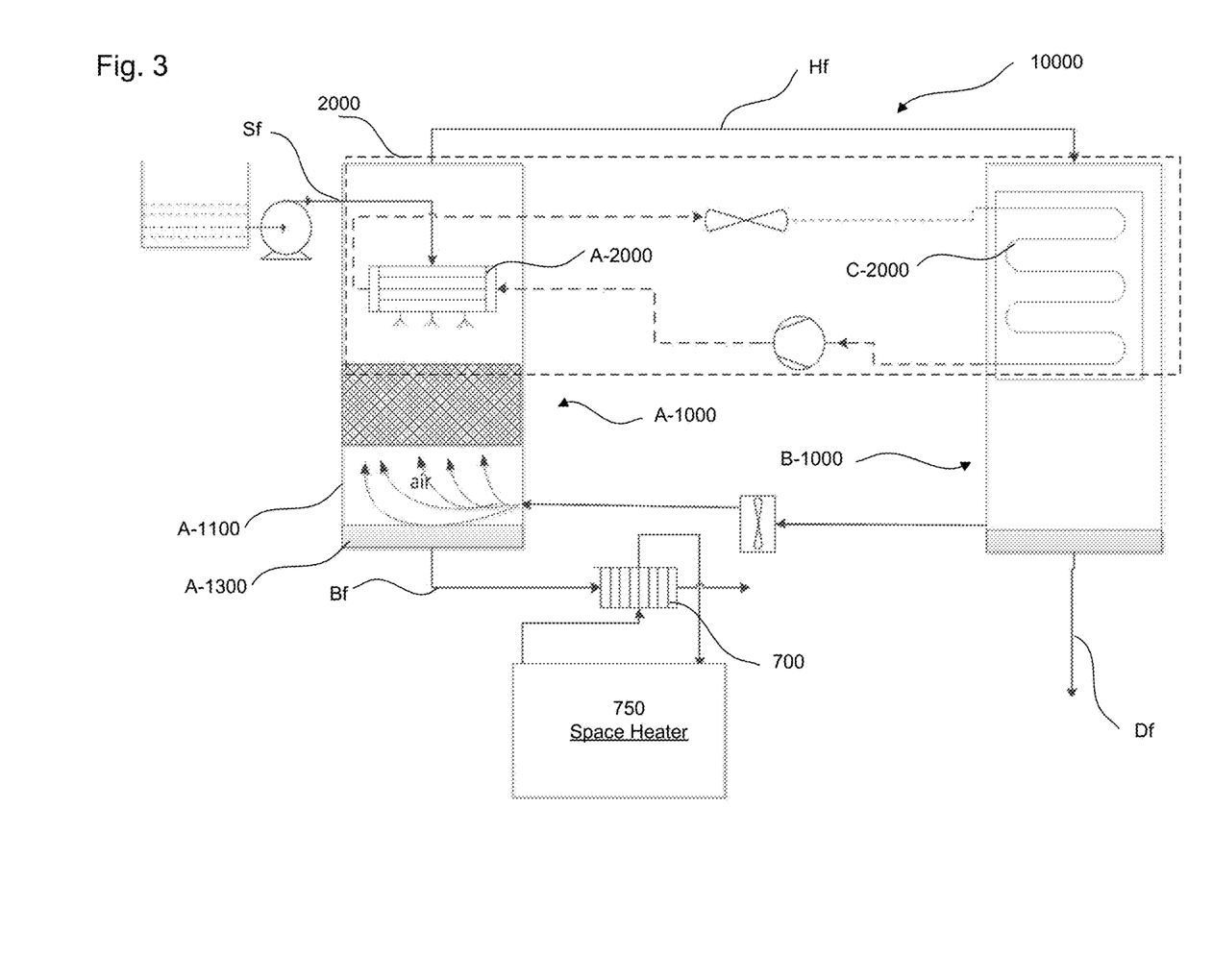
FIG. 3 is a schematic view of the desalination and climate control system in a third configuration, according to certain aspects of the disclosure.

FIG. 3 is a schematic view of the desalination and climate control system 10000 in a third configuration, according to certain aspects of the disclosure.

In addition and/or alternatively to the first supplemental heat exchanger 600, the desalination and climate control system 10000 can include a second supplemental heat exchanger 700 positioned outside the humidifier housing A-1100 and fluidly connected to the humidifier catch pan A-1300, and a space heater 750, e.g. residential and/or commercial heater, to heat the environment 100.

The second supplemental heat exchanger 700 can receive the brine fluid Bf from the humidifier catch pan A-1300, and transfer heat from the brine fluid Bf to the space heater 750. The heat transferred form the brine fluid Bf to the space heater 750 can be recovered heat from the brine fluid Bf and be used to heat the environment 100 making the desalination and climate control system 10000 more efficient.

The second supplemental heat exchanger 700 can be any type of heat exchanger configured to facilitate heat exchange between the brine fluid Bf and the space heater 750. For example, the second supplemental heat exchanger 700 can be a stacked corrugated plate heat exchanger, and/or shell and serpentine channel heat exchanger.

Figure 4:
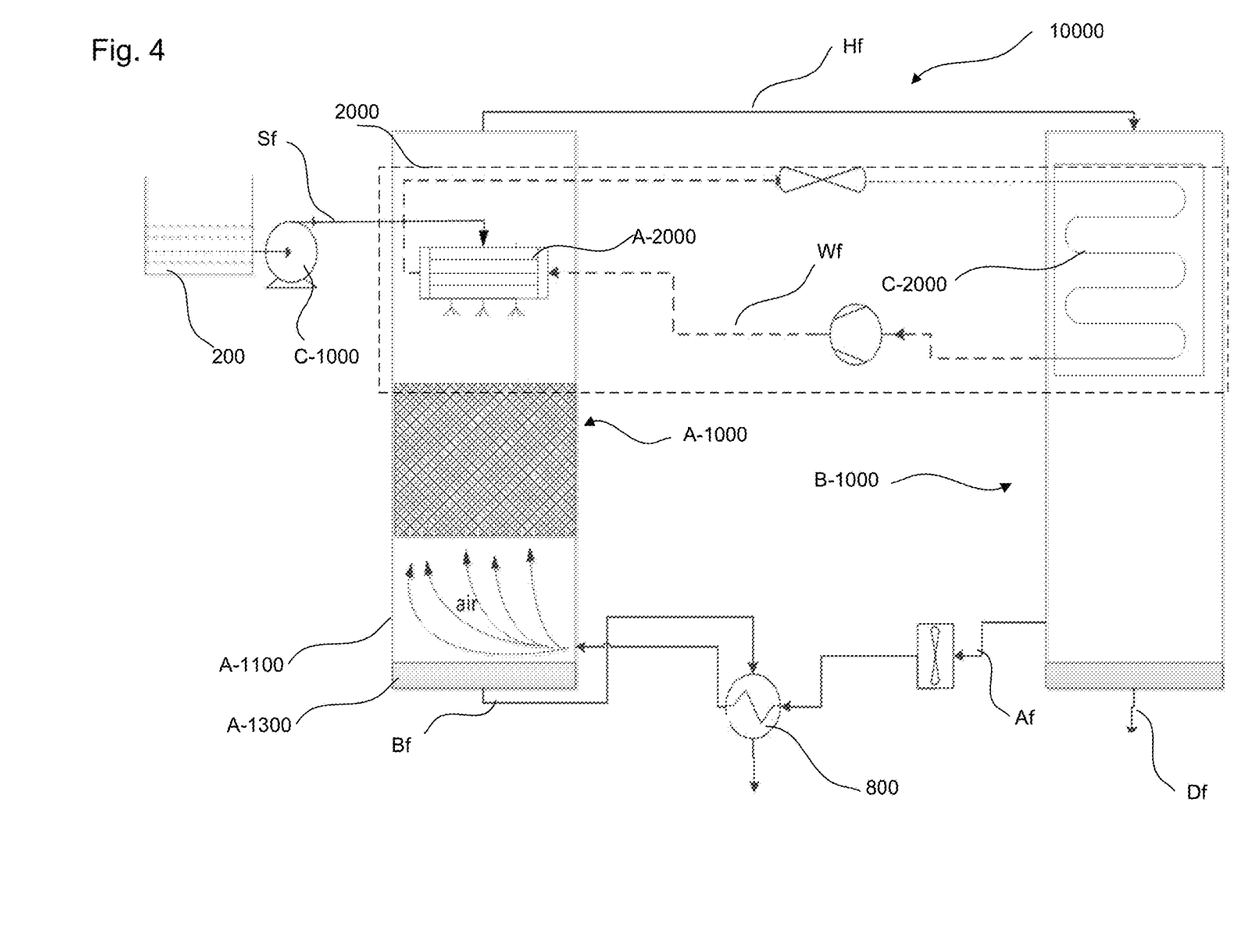
FIG. 4 is a schematic view of the desalination and climate control system in a fourth configuration, according to certain aspects of the disclosure.

FIG. 4 is a schematic view of the desalination and climate control system 10000 in a fourth configuration, according to certain aspects of the disclosure.

In addition and/or alternatively to the first supplemental heat exchanger 600 and/or the second supplemental heat exchanger 700, the desalination and climate control system 10000 can include a third supplemental heat exchanger 800 positioned outside the humidifier housing A-1100 and fluidly connected to the humidifier catch pan A-1300, the fan D-1000 and the humidifier inlet A-1200.

The third supplemental heat exchanger 800 can receive the brine fluid Bf from the humidifier catch pan A-1300, and transfer heat from the brine fluid Bf rejected from the humidifier A-1000 to the fresh air Fa pushed by the fan D-1000 before the fresh air Fa enters the humidifier A-1000. The heat transferred from the brine fluid Bf to the fresh air Fa can increase the temperature of the fresh air Fa and facilitate the evaporation of the saline fluid Sf in the humidifier A-1000 making the desalination and climate control system 10000 more efficient.

The third supplemental heat exchanger 800 can be any type of heat exchanger configured to facilitate heat exchange between the brine fluid Bf and the fresh air Fa. For example, the third supplemental 800 can be a stacked corrugated plate heat exchanger, and/or shell and serpentine channel heat exchanger.

Figure 5:
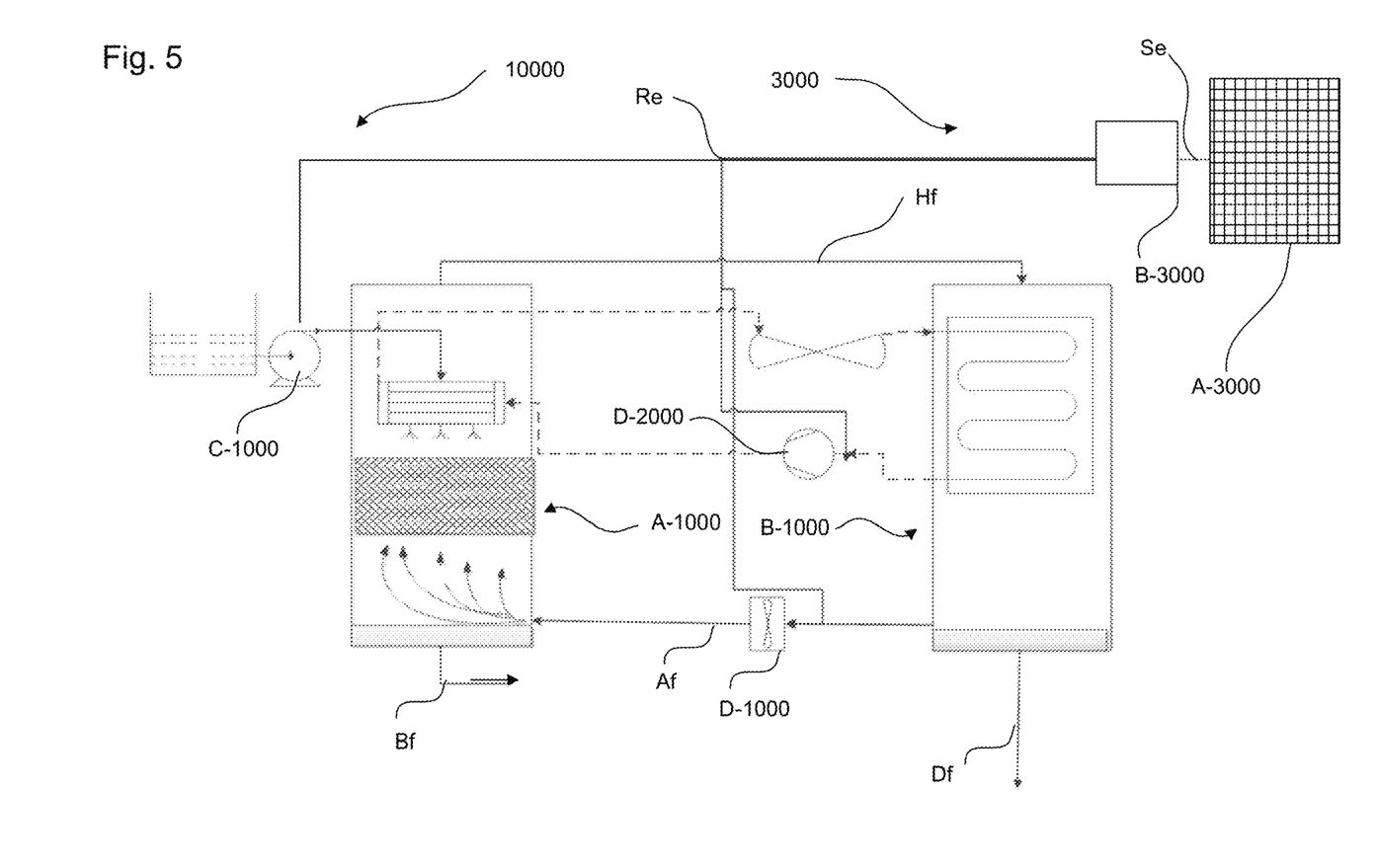
FIG. 5 is a schematic view of the desalination and climate control system in fifth configuration, according to certain aspects of the disclosure.

FIG. 5 is a schematic view of the desalination and climate control system 10000 in fifth configuration, according to certain aspects of the disclosure.

In addition and/or alternatively to the first supplemental heat exchanger 600, the second supplemental heat exchanger 700, and/or the third supplemental heat exchanger 800, the desalination and climate control system 10000 can include a solar system 3000 that collects sun light and provides electrical power for different elements of the vapor-compression system 2000 and/or the desalination system 1000, e.g. the pump C-1000, the compressor D-2000, and/or the fan D-1000.

The solar system 3000 can include photovoltaic panels A-3000, and a rectifier unit B-3000 electrically connected to the photovoltaic panels A-3000 and at least one of the pump C-1000, the compressor D-2000, and the fan D-1000.

The photovoltaic panels A-3000 can receive the sunlight and generate solar electricity Se while the rectifier unit B-3000 can receive the solar electricity Se and provide to the pump C-1000, the compressor D-2000, and/or the fan D-1000 a regulated electricity Re by rectifying and/or regulating the solar electricity Se.

The rectifier unit B-3000 can prevent transferring over voltages to the pump C-1000, the compressor D-2000, and/or the fan D-1000 to enhance performance and lifespan by providing the regulated electricity Re as an average of the solar electricity Se over a predetermined period of time.

The rectifier unit B-3000 can be a stand-alone device, as illustrated in FIG. 5, or circuitry integrated to the photovoltaic panels A-3000. To provide the regulated electricity Re, the rectifier unit B-3000 can rely on Pulse Width Modulation (PWM) and/or Maximum Power Point-Tracker (MPPT) technologies.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A desalination and climate control system comprising:
   a vapor-compression system having:
   a compressor,
   an evaporator,
   a condenser, and
   a working fluid that circulates between the evaporator, the compressor, and the condenser to transfer heat from the condenser to the evaporator; and
   a desalination system coupled with the desalination system having:
   a humidifier that encloses the condenser, receives air and saline fluid, passes the saline fluid through the condenser to extract the heat and vaporizes the saline to provide humidified air and brine fluid, and
   a dehumidifier that encloses the evaporator, condenses the humidified air, and provides the air and demineralized fluid.

2. The desalination and climate control system of claim 1, wherein
   the humidifier further includes an humidifier housing that encloses the condenser.

3. The desalination and climate control system of claim 2, wherein the humidifier further includes a humidifier catch pan positioned at a downstream portion of the humidifier housing to receive the brine fluid produced by the humidifier.

4. The desalination and climate control system of claim 3, wherein the humidifier further includes a plurality of sprayers that sprays the saline fluid coming from the condenser.

5. The desalination and climate control system of claim 4, wherein the humidifier further includes a screen between the plurality of sprayers and the humidifier catch pan that receives the saline fluid and retains the saline fluid to expose the saline fluid to fresh air.

6. A desalination and climate control system comprising:
   a vapor-compression system having:
   a compressor,
   an evaporator,
   a condenser, and
   a working fluid that circulates between the evaporator, the compressor, and the condenser to transfer heat from the condenser to the evaporator;
   a desalination system coupled with the desalination system having:
   a humidifier that encloses the condenser, receives air and saline fluid, passes the saline fluid through the condenser to extract the heat and vaporizes the saline fluid to provide humidified air and brine fluid, and
   a dehumidifier that encloses the evaporator, condensates the humidified air, and provides the air and demineralized fluid; and
   a plurality of heat exchangers that recovers heat from the brine fluid.

7. The desalination and climate control system of claim 6, wherein the plurality of heat exchangers include a first heat exchanger that transfer heat from the brine fluid to the saline fluid before the saline fluid enters the humidifier.

8. The desalination and climate system of claim 6, wherein the plurality of heat exchangers include a second heat exchanger that transfer heat from the brine fluid to the fresh air before fresh air enters the humidifier.

9. The desalination and climate control system of claim 6, wherein
   the humidifier further includes an humidifier housing that encloses the condenser.

10. The desalination and climate control system of claim 9, wherein the humidifier further includes a humidifier catch pan positioned at a downstream portion of the humidifier housing to receive the brine fluid produced by the humidifier.

11. The desalination and climate control system of claim 10, wherein the humidifier further includes a plurality of sprayers that sprays the saline fluid coming from the condenser.

12. The desalination and climate control system of claim 11, wherein the humidifier further includes a screen between the plurality of sprayers and the humidifier catch pan that receives the saline fluid and retains the saline fluid to expose the saline fluid to the fresh air.

13. A desalination and climate control system comprising:
a vapor-compression system having:
a compressor,
an evaporator,
a condenser, and
a working fluid that circulates between the evaporator, the compressor, and the condenser to transfer heat from the condenser to the evaporator;
a desalination system coupled with the desalination system having:
a humidifier that encloses the condenser, receives air via a fan and saline fluid via a pump, passes the saline fluid through the condenser to extract the heat and vaporizes the saline fluid to provide humidified air and brine fluid, and
a dehumidifier that encloses the evaporator, condensates the humidified air, and provides the air and demineralized fluid;
a plurality of heat exchangers that recovers heat from the brine fluid; and
a solar system that captures sunlight and provides electricity to at least one of the pump and the fan.

14. The desalination and climate control system of claim 13, wherein the solar system further includes a plurality of photovoltaic panels to capture the sun light.

15. The desalination and climate control system of claim 13, wherein the plurality of heat exchangers include a first heat exchanger that transfers heat from the brine fluid to the saline fluid before the saline fluid enters the humidifier.

16. The desalination and climate system of claim 13, wherein the plurality of heat exchangers include a second heat exchanger that transfers heat from the brine fluid to fresh air before the fresh air enters the humidifier.

17. The desalination and climate control system of claim 13, wherein
the humidifier further includes an humidifier housing that encloses the condenser.

18. The desalination and climate control system of claim 17, wherein the humidifier further includes a humidifier catch pan positioned at a downstream portion of the humidifier housing to receive the brine fluid produced by the humidifier.

19. The desalination and climate control system of claim 18, wherein the humidifier further includes a plurality of sprayers that sprays the saline fluid coming from the condenser.

20. The desalination and climate control system of claim 19, wherein the humidifier further includes a screen between the plurality of sprayers and the humidifier catch pan that receives the saline fluid and retains the saline fluid to expose the saline fluid to fresh air.

* * * * *